(12) United States Patent
Boyes et al.

(10) Patent No.: US 11,592,727 B2
(45) Date of Patent: Feb. 28, 2023

(54) MODULAR CAMERA MOUNTS AND CAMERAS FOR SECURITY, SURVEILLANCE, AND ACCESS CONTROL APPLICATIONS

(71) Applicant: Johnson Controls Tyco IP Holdings LLP, Milwaukee, WI (US)

(72) Inventors: Derek Joseph Boyes, Aghalee (GB); Frederick Michael Mcbride, Belfast County Down (GB)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/196,781

(22) Filed: Mar. 9, 2021

(65) Prior Publication Data

US 2021/0278755 A1  Sep. 9, 2021

Related U.S. Application Data

(60) Provisional application No. 62/987,188, filed on Mar. 9, 2020.

(51) Int. Cl.
*G03B 17/56* (2021.01)
*F16M 11/20* (2006.01)
(Continued)

(52) U.S. Cl.
CPC ........... *G03B 17/561* (2013.01); *F16M 11/10* (2013.01); *F16M 11/2014* (2013.01); *F16M 13/02* (2013.01)

(58) Field of Classification Search
CPC ..................... G03B 13/19632; G08B 13/19632
See application file for complete search history.

(56) References Cited

U.S. PATENT DOCUMENTS 6,015,123 A * 1/2000 Perez .................. F16M 13/025
   248/220.21
6,249,310 B1  6/2001 Lefkowitz
(Continued)

FOREIGN PATENT DOCUMENTS

CN     207573484 U  *  7/2018
JP     2021036290 A    3/2021

OTHER PUBLICATIONS

Networkcameratech.com article demonstrating PFB203W wall mount bracket, https://networkcameratech.com/dahua-pfb203w-wall-mount-bracket/ and associated images, dated Jun. 27, 2017 (Year: 2017).*

(Continued)

*Primary Examiner* — Leon W Rhodes, Jr.
(74) *Attorney, Agent, or Firm* — ArentFox Schiff LLP

(57) ABSTRACT

Aspects of the present disclosure relate to modular camera mounts interoperable with cameras. The modular camera mount may include a bracket comprising a first mounting portion positioned perpendicular to a camera mounting portion. The first mounting portion may facilitate securing the modular camera mount to a first surface, wherein the first surface may comprise a small area. Both the camera mounting portion and the first mounting portion may include a plurality of mounting provisions configured to align with mounting provisions of a cover. The cover may be secured to the bracket via a plurality of fasteners threaded through the mounting provisions. Securing the cover to the bracket may form a chamber therebetween, wherein the chamber may be a conduit for a cable configured to electrically connect the camera to a power source. The cover may be configured to secure the position adjustable camera via an angular adjustable bracket.

19 Claims, 6 Drawing Sheets

(51) Int. Cl.
  *F16M 11/10* (2006.01)
  *F16M 13/02* (2006.01)

(56) References Cited

U.S. PATENT DOCUMENTS

| | | | |
|---|---|---|---|
| 6,354,750 B1 | 3/2002 | Romanoff | |
| 6,476,856 B1 | 11/2002 | Zantos | |
| 7,011,460 B1 | 3/2006 | Todd et al. | |
| 7,306,383 B2 | 12/2007 | Jones et al. | |
| 7,440,027 B2 | 10/2008 | Weaver | |
| 9,004,785 B1* | 4/2015 | Mohan | G03B 17/561 |
| | | | 348/143 |
| 9,551,453 B2 | 1/2017 | Walters | |
| 9,594,294 B2 | 3/2017 | Linden | |
| 9,952,485 B1 | 4/2018 | Luski et al. | |
| 10,267,454 B1 | 4/2019 | Ortiz et al. | |
| 10,277,825 B2 | 4/2019 | Wang et al. | |
| 10,389,982 B1 | 8/2019 | Fu et al. | |
| 10,844,997 B1* | 11/2020 | Loew | F16M 13/00 |
| 11,050,907 B1 | 6/2021 | Yoo et al. | |
| 11,375,087 B1 | 6/2022 | Rhoden et al. | |
| 2004/0119881 A1* | 6/2004 | Matko | B60R 11/04 |
| | | | 348/375 |
| 2005/0031335 A1 | 2/2005 | Itzkowitz | |
| 2007/0278366 A1 | 12/2007 | McGill | |
| 2007/0278373 A1 | 12/2007 | Wang | |
| 2008/0277540 A1 | 11/2008 | Heibel | |
| 2018/0075786 A1 | 3/2018 | Thul | |
| 2018/0187828 A1 | 7/2018 | Law et al. | |
| 2020/0340620 A1 | 10/2020 | Law et al. | |
| 2021/0076829 A1 | 3/2021 | Clapp | |
| 2021/0099619 A1 | 4/2021 | Hertzman et al. | |
| 2021/0109423 A1 | 4/2021 | Ramones et al. | |
| 2021/0278037 A1 | 9/2021 | Boyes et al. | |
| 2021/0278754 A1 | 9/2021 | Boyes et al. | |
| 2021/0278755 A1 | 9/2021 | Boyes et al. | |

OTHER PUBLICATIONS

Dahua IPC-HDW5231R-Z Camera Review, https://networkcameratech.com/dahua-ipc-hdw5231r-z-review/, dated Jun. 21, 2017 (Year :2017).*
Amazon.com product listing for Simptronic wall mount bracket, https://www.amazon.com/Camera-Mount-Bracket-Plastic-Security/dp/B01BY0KKXQ (Year: 2016).*

* cited by examiner

MODULAR CAMERA MOUNTS AND CAMERAS FOR SECURITY, SURVEILLANCE, AND ACCESS CONTROL APPLICATIONS

CROSS REFERENCE TO RELATED APPLICATIONS

This application claims priority to U.S. Provisional Application No. 62/987,188 filed on Mar. 9, 2020, and titled "MODULAR CAMERA MOUNTS AND CAMERAS FOR SECURITY, SURVEILLANCE, AND ACCESS CONTROL APPLICATIONS," the contents of which is hereby incorporated by reference in the entirety.

TECHNICAL FIELD

Aspects of the present disclosure relate to modular camera mounts configured to securably mount cameras for security, surveillance, access control or other implementations a variety of different environments, such as environments that have limited mounting surface area or mounting configurations.

BACKGROUND

With modern advances in technology, cameras have been adapted to be implemented as security mechanisms capable of monitoring various physical locations or acting as access security or identity verification systems so as to replace the need for constant surveillance by human guards. When configured to monitor or surveil, these cameras may be placed such that they are discrete and not otherwise noticeable to individuals within the space they record. However, when configured to function as an access control or identity verification system, these cameras require placement in comparatively more obvious locations, such as at eye level or otherwise adjacent to a door, for example, in order to facilitate facial recognition technology or other similar identification methods by the camera.

Thus, there exists an unmet need in the related art for a camera configured for security, surveillance, and/or access control that can be mounted a wide variety of different environments that include a wide variety of different materials and architectural styles.

SUMMARY

Consequent of the deficiencies described above, as well as others, there remains an unmet need for a camera configured for surveillance, security, access control, or other similar monitoring needs, wherein the camera includes a modular mount interoperable with the camera, such that the modular mount may facilitate the secure installation of the camera in a variety of different environments.

In view of the above problems and short comings, as well as others, aspects of the present disclosure relate, among other things, to modular camera mounts interoperable with security cameras implementable in a wide variety of different environments. The modular camera mount, according to various aspects, may include a bracket, wherein the bracket may further include a first mounting portion positioned substantially perpendicular to a camera mounting portion. The first mounting portion that may facilitate securing the modular camera mount to a first surface, wherein the first surface may comprise a small surface area, such as a jamb, for example. Both the camera mounting portion and the first mounting portion may include a plurality of mounting provisions. Further, the modular camera mount may also include a cover, wherein the cover may also include a plurality of mounting provisions positioned such that the mounting provisions correspond to the mounting provisions of the camera mounting portions. The cover may be secured to the bracket via a plurality of fasteners configured to be threaded through the mounting provisions of both the bracket and the cover. In one example, the plurality of fasteners may be screws. Securing the cover to the bracket may form a chamber therebetween, wherein the chamber may be configured to be a conduit for a cable configured to electrically connect the camera with a power source located at a distance away from the camera, such as a standard wall outlet located elsewhere in which the environment the camera is being installed. Further, the cover may also include a second camera mounting portion, wherein the second camera mounting portion may be configured to secure the camera. Finally, the modular camera mount may include an angular adjustable bracket, wherein the angular adjustable bracket may be configured to facilitate the adjustment of the camera with respect to the bracket.

The modular camera mount allows for a camera to be securably mounted to a wide variety of small surfaces, and thus increasing the flexibility of placement of the camera upon installation. Additional advantages and novel features of these aspects will be set forth in part in the description that follows, and in part will become more apparent to those skilled in the art upon examination of the following or upon learning by practice of the disclosure.

DETAILED DESCRIPTION

Figure 1:
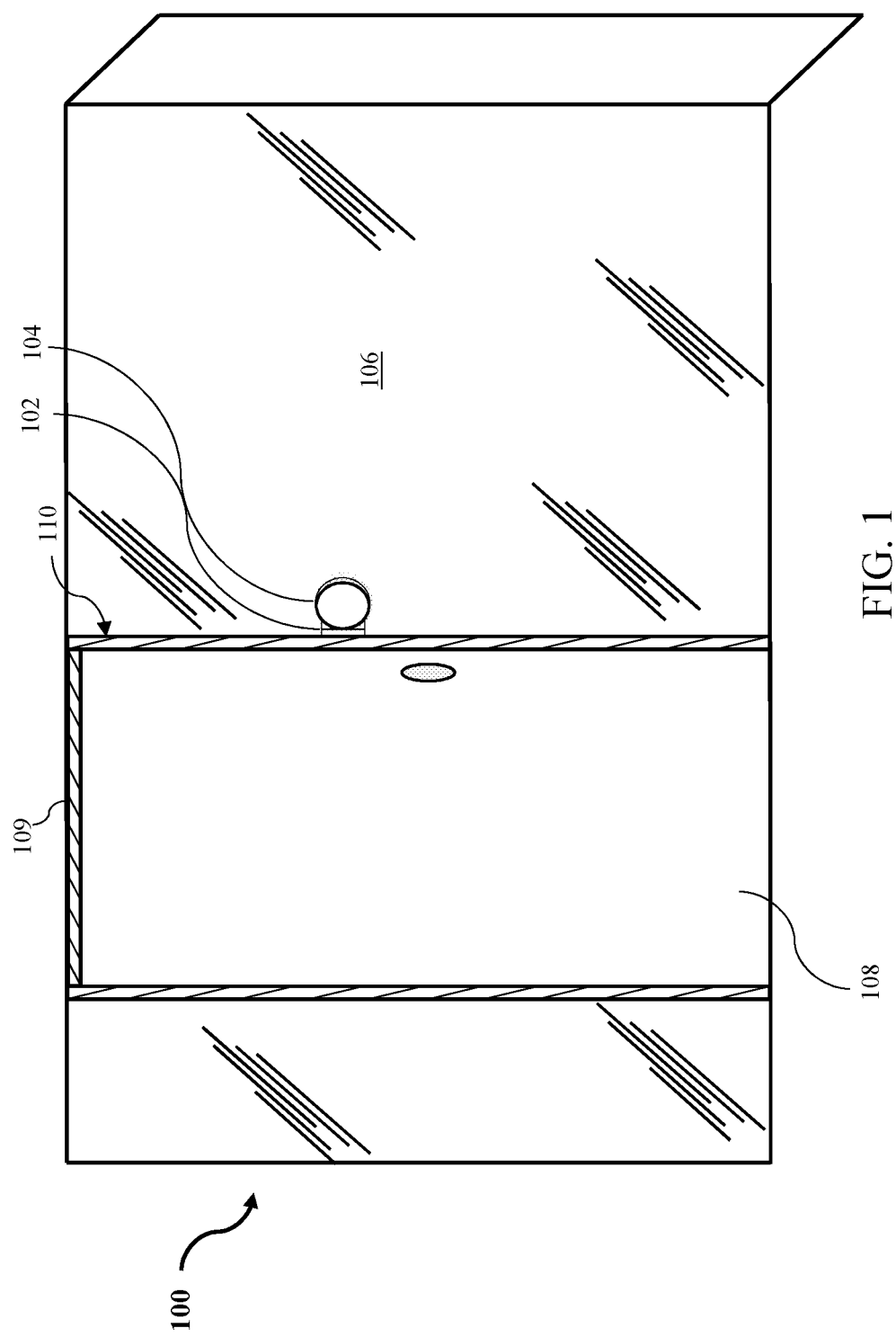
FIG. 1 is a front view of an environment, including a door, a door frame, and an adjacent wall comprising a material having limited mounting capabilities, such as glass, in which an example modular camera mount and camera are implemented, according to various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Throughout the disclosure, the term substantially may be used as a modifier for a geometric relationship between elements or for the shape of an element or component. While the term substantially is not limited to a specific variation and may cover any variation that is understood by one of ordinary skill in the art to be an acceptable variation, some examples are provided as follows. In one example, the term substantially may include a variation of less than 10% of the dimension of the object or component. In another example, the term substantially may include a variation of less than 5% of the object or component. If substantially is used to define the angular relationship of one element to another element, one non-limiting example of the term substantially may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the system and apparatus described herein is installed an in an in-use orientation. Further, in order to provide context to the current disclosure, a broad overview of the discovered deficiencies of various systems and an example implementation of the current disclosure and the advantages provided by the disclosure are described below. Further details of example implementations of the current disclosure are described in detail with reference to the figures below.

When cameras are used, for example, for performing access control functions within environments designed to include walls, doors, and other physical barriers comprised of materials that are challenging to mount cameras to, such as glass. These environments may lack with sufficient space to securely mount or otherwise install a traditional camera. Thus, within environments that are predominantly constructed of non-drillable or otherwise securable materials, such as glass, there are limited ways to adequately secure the camera. This problem is especially prevalent when a camera is used for identification or access control functions where the camera is ideally located at an appropriate height to perform its identification function for people of all heights. Further, when cameras are used for identification or access control functions, the camera may also require placement at a height appropriate for people that are handicapped and/or people that use mobility assisting devices, such as a wheel chair for example. Thus, the camera may need to be mounted lower than a typical security camera which poses mounting challenges. For example, since the camera is in the line-of-sight of most people, aesthetics may be important to ensure that the camera is not obtrusive or unsightly. Further, the camera system may require additional protection from damage or undesired movement due to a person or object bumping into or otherwise contacting the camera.

Referring to FIG. 1, according to various aspects of the present disclosure, a modular camera mount 102 and a camera 104 may be installed in an example in-use orientation, such as relative to a door within a predominantly glass-walled environment 100. Generally, predominantly glass environment 100 may be comprised of a physical location, such as hall ways, corridors, atriums, waiting rooms, entrances or porches, for example. In predominantly glass environment 100 the main structural surfaces, such as the walls, may be comprised predominantly of glass or other similar materials. For example, environment 100 of FIG. 1 may include a door 108 disposed within a door frame 109 in a wall 106. Wall 106 and door 108 may be configured to limit access to a designated space located behind wall 106 and door 108. Further, door 108 and wall 106 may be comprised predominantly of glass, such that there may limited locations to secure traditional security cameras, surveillance cameras, access control cameras, or other similar monitoring cameras, such that the camera may both be positioned adequately relative to the people, objects, or otherwise the camera is configured to monitor, while also being sufficiently secured to a structural surface within environment 100, as neither wall 106 nor door 108 are comprised of a material that allows for easily and securely mounting a camera thereto (e.g., walls 106 and/or door 108 may be transparent or semi-transparent and formed of a material such as glass that is not easily drilled, screwed, or otherwise tapped in a traditional sense. However, FIG. 1 illustrates an example implementation of such a camera mount and associated camera, such as modular camera mount 102 and camera 104, that provide a solution for the deficiencies described above, such that modular camera mount 102 and camera 104 may be mounted within environment 100 via a mounting surface 110, which may for example be the door frame 109, a support column, and/or or a jamb or any surface of any other structural member associated with the door 108 and/or the wall 106. The first mounting surface 110 may be comprised of a mountable material, such as metal, plastic, composite and/or sheet-rock, for example. In FIG. 1, first surface 110 is a door frame; however, first surface 110 is not limited to including just a door frame. Modular camera mount 102 and camera 104 may be configured to be as small as what allows for the continued protection and sufficient securing of the camera within environment 100. Consequent of various aspects of the present disclosure at least some of which that will be described in greater detail in the sections that follow, modular camera mount 102 may result in the appearance that camera 104 may be floating relative to the predominantly glass environment 100, and while also facilitating increased flexibility in the placement of camera 104 within any environment via modular camera mount 102.

Figure 2:
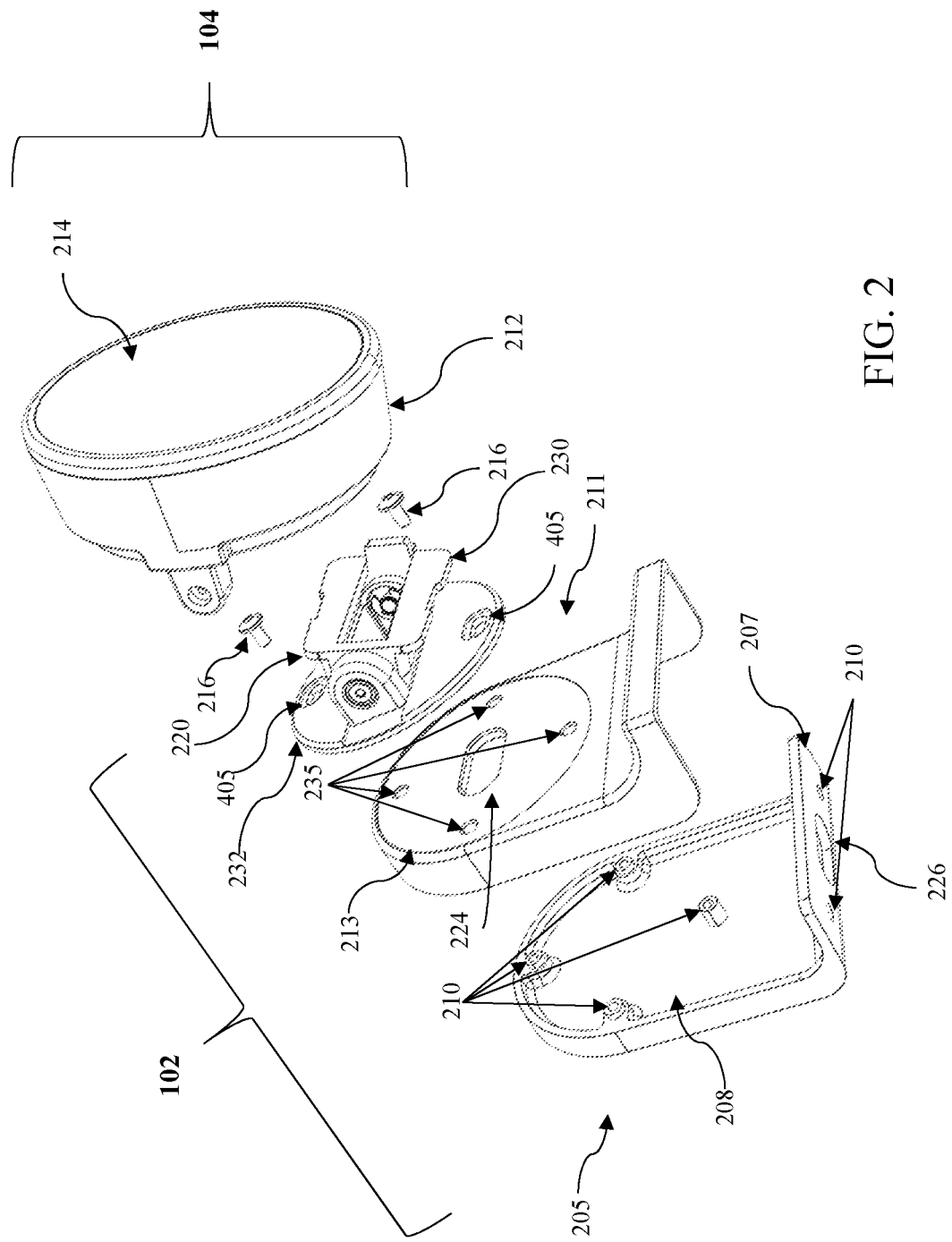
FIG. 2 is a front exploded perspective view of an example modular camera mount and camera, according to aspects of the present disclosure.
Figure 4:
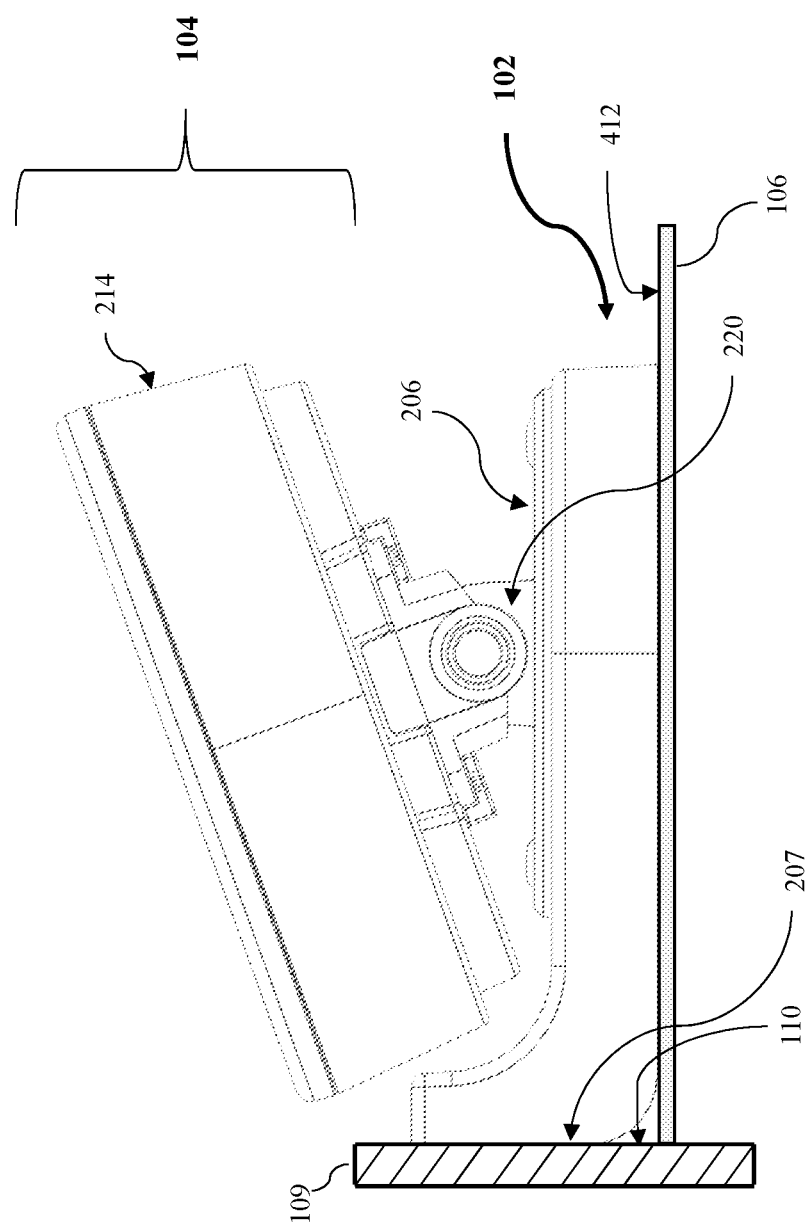
FIG. 4 is a bottom view of an example modular camera mount and camera, according to aspects of the present disclosure.
Figure 5:
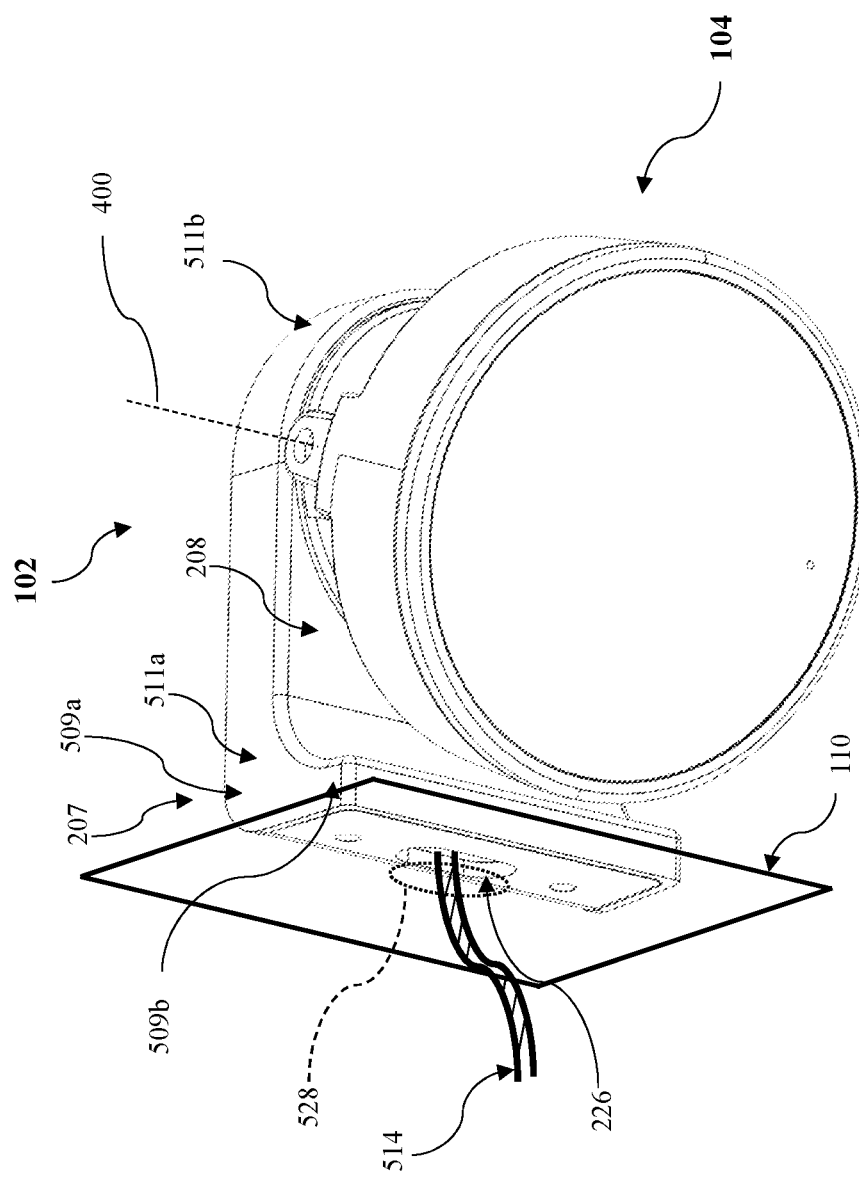
FIG. 5 is a front assembled perspective view of an example modular camera mount and camera mounted to a surface, according to aspects of the present disclosure.
Figure 6:
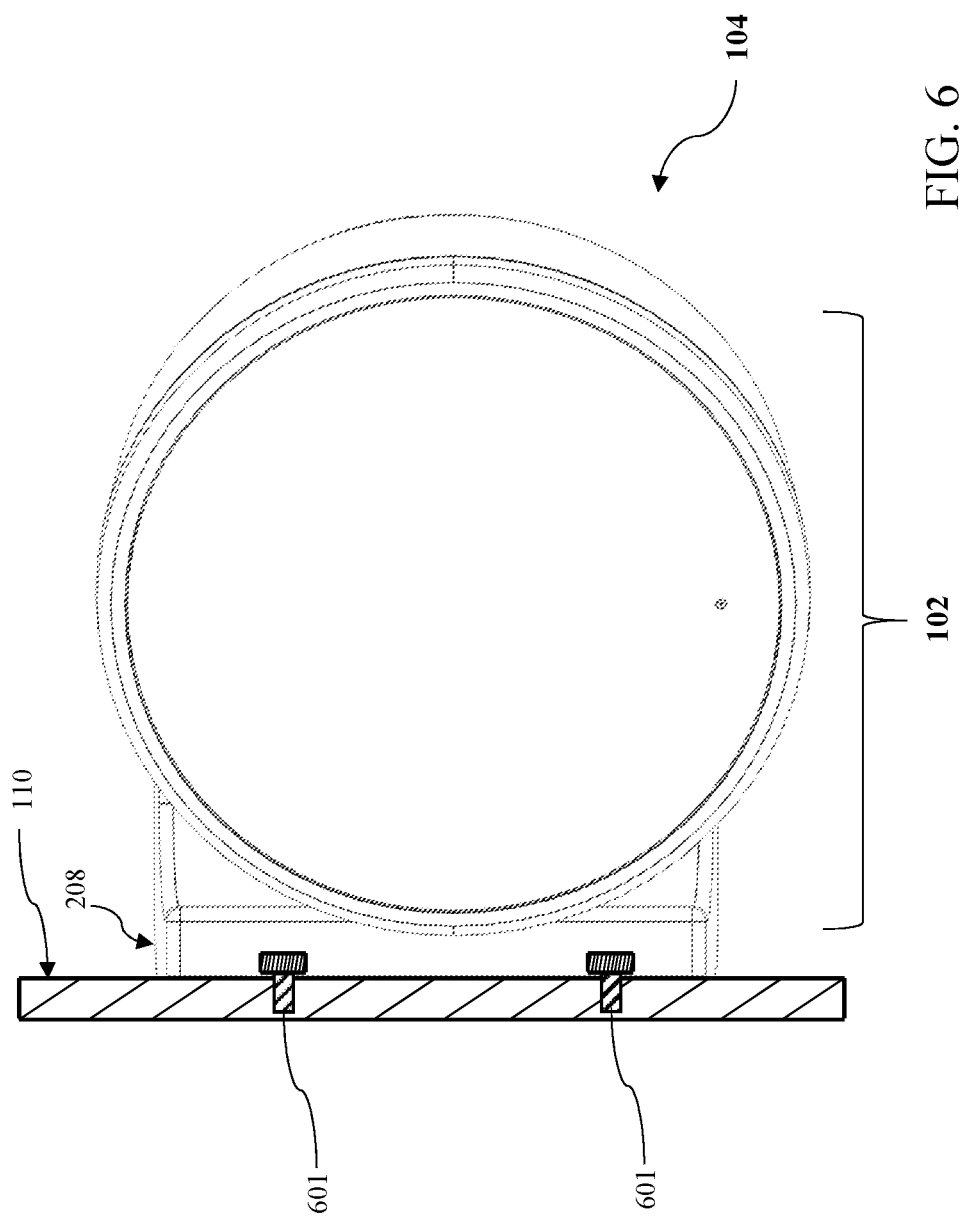
FIG. 6 is a front, partial cross-sectional, assembled view of an example modular camera mount and camera mounted to a surface, according to aspects of the present disclosure.

Referring to FIG. 2, the modular camera mount 102 includes one or more components configured to secure the camera 104 to a first surface (e.g., first surface 110 in FIG. 1 and in FIGS. 4-6). In one implementation, for example, the first surface 110 may be relatively small in area, such as a portion of door frame 109 extending from wall 106 (see FIG. 1), for example. Camera 104 may comprise a body 212, wherein body 212 may be configured to house a camera lens 214. Camera lens 214, may for example function as a cover that provides protection to a single or a plurality of camera lenses beneath lens 214. In one example, the camera 104 may include a single or plurality of wide angle camera's and/or lenses configured to monitor at least a 110° angle of view. However, in another example, camera 104 may include a single or plurality of non-wide angle camera's or lenses configured to monitor less than a 110° angle of view, such as a traditional camera and/or lens configured to monitor a 63° angle of view. Camera body 212 may further house a variety of other technological and electronic equipment necessary for the operation of the camera that are known in art, such as a lens aperture, mirrors, an imaging sensor, and/or a focusing screen, for example. The camera may further comprise known systems for processing images or video and/or storing images or video. Camera 104 may be configured to perform a variety of security, surveillance, or access control functions. In one example camera 104 may be configured to surveil or monitor the environment in which it is located. Further, the camera 104 may be configured to operate as an access reader either as an alternative to or in conjunction with the aforementioned surveillance functions. In this example, the camera may be configured with facial recognition technology, and secured to first surface (e.g., first surface 110 in FIG. 1 and/or first surface 606 in FIGS. 4-6) such that the camera may be positioned to accurately recognize facial features of individuals of a plurality of heights, including those individuals in wheel chairs or other mobility aiding devices.

Modular camera mount 102 may include a bracket 205, wherein bracket 205 may comprise a first mounting portion 207, and the bracket 205 may be configured to be mounted to first surface (e.g., first surface 110 in FIG. 1 and/or first surface 606 in FIGS. 4-6) at first mounting portion 207. In one example, bracket 205 may be configured to be substantially L-shaped; however, bracket 205 is not limited to an L-shaped configuration. Further, bracket 205 and first mounting portion 207 may be comprised of a variety of materials, such as a plastic, a composite, metal, metal alloy, or other similar material that is sufficiently structurally rigid, such that modular camera mount 102 may provide support for and/or protect camera 104 from a variety of blunt force attacks, accidental contact, or other types of contact. For the purposes of this disclosure, the term "sufficiently structurally rigid" may be defined by the ability of a material to successfully endure an abuse test of at least 10 IK. Additionally, bracket 205 may also include a camera mounting portion 208, wherein camera mounting portion 208 may be configured to be substantially perpendicular to first mounting portion 207. In one example, the bracket 205 may be formed from a single piece of bent plate steel, aluminum, or alloys thereof. For example, the bracket may be manufactured by cutting or otherwise separating an outline of the bracket from a piece or pieces of plate steel, aluminum, or alloys thereof and then bending the single piece of material to form the camera mounting portion 208 and the first mounting portion 207. In another example, the bracket 205 may be molded or otherwise formed to arrive at the shape shown in FIGS. 2 and 3. In some examples, the bracket 205 may be formed of steel, aluminum, or alloys thereof. As an alternative, the bracket 205 may be formed of plastic, fiber-reinforce plastics, composites or any non-metallic material known in the art.

Both camera mounting portion 208 and first mounting portion 207 may include a plurality of mounting provisions 210. In one example, at least some of the plurality of mounting provisions 210 may comprise a recess, wherein the recess may be configured to receive a plurality of fasteners 216. For example, the mounting provisions 110 may be threaded and configured to receive a corresponding threaded fastener and/or may be dimensioned to receive a self-tapping fastener, to name a few examples. In another example, mounting provisions 210 may be configured to be primarily circular in cross section; however, camera mounting portion is not limited to a cross-sectionally circular shape. For example, mounting provisions 210 may be rectangular in cross-section. As illustrated in FIG. 2, camera mounting portion 208 may be rounded on a single side of the otherwise rectangular cross-sectional area, among a variety of other shapes or cross-sectional areas. In one example implementation of the bracket 205 being formed from a single piece of bent material, the mounting provisions 210 may be welded thereto. In one example, the mounting provisions 210 may be adhered using ultrasonic welding or friction welding. In another example, the mounting provisions 210 may be stamped or otherwise formed to protrude from the bracket 205.

FIG. 2 further includes an example of a cover 211 in accordance with one aspect of the disclosure. The cover 211 may be configured to substantially cover and interact with bracket 205. Cover 211 may include a second camera mounting portion 213, wherein second camera mounting portion 213 may be configured to secure camera 104 thereto. Similar to cover 211 and bracket 205, second camera mounting portion 213 may approximately correspond in shape and cross-sectional area to camera mounting portion 208, such that second camera mounting portion 213 may effectively cover the surface area of camera mounting portion 208. Second camera mounting portion 213 may also be configured to selectively receive a plurality of fasteners 216 through mounting provisions 235. Fasteners 216 may include any combination of screws, rivets, bolts or other similar devices configured to secure a plurality of modular components relative to each other via mounting provisions 210, wherein mounting provisions 210 may comprise recesses of a variety of shapes depending on the type, size, and shape of implemented fasteners 216. Cover 211 may be configured to interact and be mounted to bracket 104, such that camera mounting provisions 210 may align with the cover mounting provisions 235. When camera mounting provisions 210 are aligned with mounting provisions 235 of the cover 211, fasteners 216 may be threaded or otherwise inserted through mounting provisions 210 after being passed through the mounting provisions 235 of cover 211. Such a positioning may secure bracket 205 to cover 211. Further, when cover 211 and bracket 205 are secured by fasteners 216, cover 211 and bracket 205 may be configured to define a chamber therebetween. The chamber may be configured to define a conduit through which camera 104 may be electrically connected to an external power source and/or a network via a cable, wire, or other electrically conductive pathway as further described with relation to FIG. 5.

FIG. 2 also includes an angular adjustment bracket 220, wherein angular adjustment bracket 220 may be configured to be fixed to second camera mounting portion 213 of cover 211. Angular adjustment bracket 220 may be comprised of an adjusting component 230 fixed to a base component 232. Adjusting component 230 may be configured to allow for the adjustment of an angle of camera 104, and thus camera lens 214 with relation to the second camera mounting portion 213 of cover 211, it is noted that throughout the disclosure the second camera mounting portion 213 may be interchangeably referred to as the second portion. In one example, adjusting component 230 may comprise a pivoting member, wherein the pivoting member may allow camera 104 to rotate or pivot at least 20° about an axis 400 in FIG. 5, relative to the second camera mounting portion 213 of bracket 211. In another example, adjusting component 230 may be a hinge configured to allow camera 104 to adjust the viewing angle. In addition, base component 232 may be configured to secure angular adjustment bracket 220 to cover 211. As included in FIG. 2, base component 232 may be cross-sectionally circular in area, wherein the circle is defined by a diameter of 95 mm. In an additional example, base component 232 may be defined by a diameter greater than 95 mm, and in a third example base component 232 may include a diameter less than 95 mm. The size of the cross-sectional area of base component 232 may be altered based on the size of the camera, or any other plurality of parameters. Base component 232 may also include base component mounting provisions 405. The base component mounting provisions 405 may for example be a series of holes configured to align with the bracket mounting provisions 110 and the cover mounting provisions 235. Accordingly, the base component 232 may be mountable to the bracket 205 and the cover 211 by passing a series of fasteners (e.g., ref. 216) through the base component mounting provisions 405 and the cover mounting provisions 235 and threading the fasteners into corresponding bracket mounting provisions 110. In one example, the bracket mounting provisions 210 may include four mounting provisions, the cover mounting provisions 235 may include four mounting provisions and the base component mounting provisions 405 may include two mounting provision configured to align with two of the four mounting provisions of the cover and the bracket. Accordingly, the base component 232 may be mounted to the cover 211 and bracket 205 in a first orientation or a second orientation that is rotated substantially 90 degrees from the first orientation.

Optionally, in some example implementations, cover 211 may further include an opening 224, which may be substantially centrally located. Opening 224 may be configured to provide a passage to the aforementioned chamber formed when the cover 211 is mounted to bracket 205. Wires, cables or other similar mechanisms may be threaded through the opening 224, such that camera 104 may electrically connected to an external source of power (not illustrated) and/or provided with a signal and/or network cable. The external source of power may be located elsewhere in the surrounding environment, and may be include a variety of different power sources, such as a traditional wall-based outlet, a battery, or other power generating mechanism, for example. The chamber formed when the cover 211 is mounted to bracket 205, may be comprised of a plurality of openings, such as opening 224, and may be configured to allow wires (e.g., as shown in by reference number 514 in FIG. 5) to be threaded through a hole (e.g., hole 528 in FIG. 5) in the mounting surface, through a second opening 226 in bracket 104 and then opening 224 and to the camera 104, e.g., via a connector (not shown).

Figure 3:
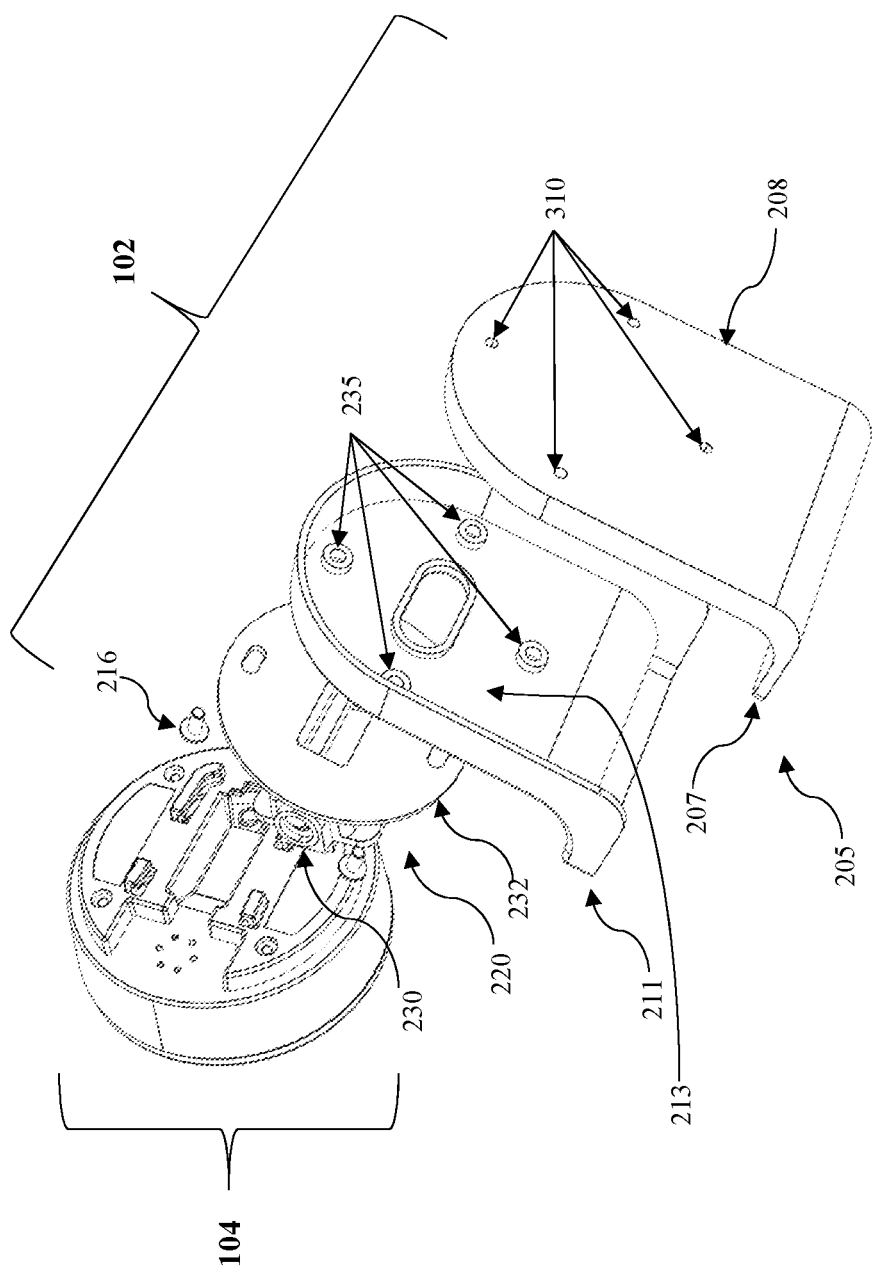
FIG. 3 is a rear exploded perspective view of an example modular camera mount and camera, according to aspects of the present disclosure.

Referring to FIG. 3, the camera mount 102 may include a bracket 205 having a first mounting portion 207 and a camera mounting portion 208, wherein camera mounting portion 208 and first mounting portion 207 may be substantially perpendicular to one another. The first mounting portion 207 may be configured to secure the modular camera mount 102 and camera 104 to a first surface (e.g., surface 110 in FIGS. 1 and 4). As described with respect to FIG. 2, bracket 205 may also be configured to be L-shaped, though bracket 205 is not limited to an L-shaped configuration. Bracket 205 may further include the camera mounting portion 208, the underside of which is shown in FIG. 3. Both camera mounting portion 208 and first mounting portion 207 may include a plurality of mounting provisions 210, wherein mounting provisions 210 may facilitate securing the different modular components of modular camera mount 302 to each other. In FIG. 3, mounting provisions 210 of first mounting portion 207 are obscured from view due to the perspective of the illustration. In another example, mounting provisions 210 may be configured to form a recess in camera mounting portion 208, such that mounting provisions 210 may selectively receive a plurality of fasteners 216. FIG. 3 further includes the cover 211, wherein cover 211 may be configured to be substantially similar in shape, cross-sectional area, or geometry to bracket 205 so as to fully cover bracket 205 to provide an improved aesthetic and hide any wiring between bracket 205 and cover 211. Cover 211 may include a camera mounting portion 213, wherein camera mounting portion may be configured for mounting a camera, such as camera 104, thereto. Cover 211 may further include an additional plurality of mounting provisions 210*b*.

In FIG. 3, the underside of the angular adjustment bracket 220 may be configured to be mate with or be positioned on camera mounting portion 213 of cover 211. Angular adjustment bracket 220 may be comprised of an adjusting component 230 fixed to a base component 232. Adjusting component 230 may be configured to allow for the adjustment of an angle of view of camera 104, and thus camera lens 214 with relation to cover 211. As mentioned with regard to FIG. 2, base component 232 of FIG. 3 may be configured to be cross-sectionally circular, wherein in an example implementation the circle may be approximately 95 mm in diameter. However, the diameter of the circle is not limited to 95 mm, and may be adjusted to include a larger or smaller diameter. Further, base component 232 is also not limited to a circular cross-section. In another example, the cross-sectional area of base component 232 may be configured to be any variety of geometric shapes, such as square, rectangular, or triangular, for example. The size of the cross-sectional area of base component 232 may be altered based on the size of the camera, or any other plurality of parameters.

Referring to FIG. 4, in an example implementation, the camera 104 may be securably fixed to the modular mount 102, which may be removable fixed to a structural member such as the door frame 109 of the door 108 (see FIG. 1). As such, the body of the modular mount 102 may extend substantially parallel to the wall 106, which may be a non-structural material or a non-suitable mounting member, such as glass. Modular mount 102 may include a camera mounting portion 206 and a first mounting portion 208, wherein first mounting portion 208 may configured to be substantially perpendicular to first mounting portion 208. Further, first mounting portion 207 may be configured to secure modular mount 102 and camera 104 to the first surface 110. First surface 110 may be a surface of small area, wherein first surface 110 may be comprised material that is capable of receiving a variety of different mounting mechanisms, such as screws, nails, clips, bolts, and/or adhesives for example. In a predominantly glass environment, such as environment 100 of FIG. 1, first surface 110 may include or be a part of the door frame 109, a door jam, or other similar structural or non-structural member. In contrast, camera mounting portion 406 of modular mount 402 may come in contact with, abut, or otherwise rest upon a second surface 412, wherein second surface 412 may be a surface or face of the wall 106, such as a glass wall or other transparent or semi-transparent wall, such as wall 104 of FIG. 1, for example. However, camera mounting portion 206 of modular mount 102 may not to be securably attached to second surface 412. Further, in another example, the camera mounting portion 206 of modular mount 102 may be spaced from second surface 412. The aforementioned configuration allows for camera 104 to be selectively securable to a small surface within an environment that may not otherwise allow for the installation or mounting of a traditional security, surveillance, or access control camera.

Additionally, in FIG. 4, the angular adjustment bracket 220 may be configured to allow for the adjustment of camera 104 relative to camera mounting portion 102. Further, as mentioned above, camera 104 may include the camera body 214 configured to house a variety of different camera elements.

Referring to FIG. 5, another example implementation of the assembled modular camera mount 102 of FIGS. 2-3 with the camera 104 mounted thereto, and secured to the first surface 110, includes one or more features, such as openings 526 and 528, for providing access to power and/or electrical signaling cables to and/or from the camera 104. For example, the modular camera mount 102 may include a first mounting portion 208 with a first end 509a and a second end 509b, and a camera mounting portion 210 which may include a first end 511a and a second end 511b. Camera mounting portion 510 may be connected to first mounting portion 208 at first end 509a of first mounting portion 508 and first end 511a of camera mounting portion 510, such that first mounting portion 207 may be configured to be substantially perpendicular to camera mounting portion 210. Further, the opening 526 may be positioned to correspond with a surface opening 528 in first surface 110. Opening 226 may be ovular in shape, as illustrated in FIG. 5; however, the shape or geometry of opening 226 is not limited to the shape as illustrated, and may be adjusted based on the shape which best facilitates the placement of cables or wires, such that the cables or wires may connect to camera 104. In one example, a cable 514 may connect a wall socket in an adjacent wall via opening 528 in first surface 110, wherein cable 514 may then be threaded through corresponding opening 226 and may be connected to camera 104 via a connector for example.

Referring to FIG. 6, the camera 104 is securable to a first surface 110 via one or more fastening mechanism 601 that connect the modular camera mount 102 to the first surface 110. The one or more fastening mechanisms 601 may be any type of fixed or removable fastener, such as a screw, a bolt, a rivet, etc.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

The claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A camera and camera mount, comprising:
a bracket having a camera mounting portion with camera mounting provisions for mounting the camera thereto and a first mounting portion configured to be mounted to a first surface, wherein the first mounting portion includes a plurality of mounting provisions for passing a corresponding fastener therethrough to mount the first mounting portion of the bracket to the first surface; and
a cover configured to cover at least a portion of the bracket, wherein the cover includes a cover camera mounting portion for mounting the camera thereto.

2. The camera and camera mount of claim 1, wherein the camera mounting portion is substantially perpendicular to the first mounting portion.

3. The camera and camera mount of claim 2, wherein the camera is mounted to the bracket via the cover.

4. The camera and camera mount of claim 3, wherein the camera mounting provisions are configured to receive fasteners passed through a corresponding series of openings in a second portion of the cover.

5. The camera and camera mount of claim 4, wherein the first mounting portion includes a bracket cable route opening and wherein the cover includes a cover cable route opening.

6. The camera and camera mount of claim 5, wherein the cover is configured to mount to the bracket and define a chamber therebetween, wherein when the cover is mounted to the bracket the chamber defines a conduit connecting the bracket cable route opening and the cover cable route opening.

7. The camera and camera mount of claim 6, wherein the cover comprises a first portion for covering the first mounting portion of the bracket and a second portion configured to cover the camera mounting portion of the bracket, wherein the first portion is substantially perpendicular to the second portion.

8. The camera and camera mount of claim 7, wherein when the cover is mounted to the bracket, the camera mounting provisions align with the series of openings in the second portion of the cover, and wherein the camera is mounted to the bracket by passing a series of threaded fasteners through the series of openings and threading the fasteners into the camera mounting provisions.

9. The camera and camera mount of claim 8, wherein the camera comprises a camera body and an angular adjustment bracket, wherein the angular adjustment bracket is mounted to the camera mounting provisions of the bracket and abuts the second portion of the cover, and wherein the angular adjustment bracket allows for adjustment of an angle of the camera with relation to the second portion of the cover.

10. The camera and camera mount of claim 9, wherein the angular adjustment bracket is configured to pivotally mount the camera body to the camera mount, wherein the angular adjustment bracket allows the camera to rotate about 20 degrees with relation to the camera mount.

11. The camera mount of claim 1, wherein the camera mounting portion is substantially perpendicular to the first mounting portion.

12. The camera mount of claim 11, wherein the camera is mounted to the bracket via the cover.

13. The camera mount of claim 12, wherein the camera mounting provisions are configured to receive fasteners passed through a corresponding series of openings in a second portion of the cover.

14. The camera mount of claim 13, wherein the first mounting portion includes a bracket cable route opening and wherein the cover includes a cover cable route opening.

15. The camera mount of claim 14, wherein the cover is configured to mount to the bracket and define a chamber therebetween, wherein when the cover is mounted to the bracket the chamber defines a conduit connecting the bracket cable route opening and the cover cable route opening.

16. The camera mount of claim 15, wherein the cover comprises a first portion for covering the first mounting portion and a second portion that is configured to cover the camera mounting portion of the bracket, wherein the first portion is substantially perpendicular to the second portion.

17. The camera mount of claim 16, wherein when the cover is mounted to the bracket, the camera mounting provisions align with the series of openings in the second portion of the cover, and wherein a camera is mounted to the bracket by passing a series of threaded fasteners through the series of openings and threading the fasteners into the camera mounting provisions.

18. The camera mount of claim 17, wherein the camera comprises a camera body and an angular adjustment bracket, wherein the angular adjustment bracket is mounted to the camera mounting provisions of the bracket and abuts the second portion of the cover.

19. A camera mount for mounting a camera to a first surface comprising:
   a bracket having a camera mounting portion with camera mounting provisions for mounting the camera thereto and a first mounting portion configured to be mounted to the first surface, wherein the first mounting portion includes a plurality of mounting provisions for passing a corresponding fastener therethrough to mount the first mounting portion of the bracket to the first surface; and
   a cover configured to cover at least a portion of the bracket, wherein the cover includes a cover camera mounting portion for mounting the camera thereto.

\* \* \* \* \*